United States Patent [19]

Shields et al.

[11] Patent Number: 5,204,184
[45] Date of Patent: Apr. 20, 1993

[54] MICROENCAPSULATION USING TERTIARY ALIPHATIC ISOCYANATE CAPSULE WALL MATERIAL

[75] Inventors: Richard L. Shields, Dayton; Michael Seitz, Miamisburg, both of Ohio

[73] Assignee: The Standard Register Company, Dayton, Ohio

[21] Appl. No.: 579,950

[22] Filed: Sep. 10, 1990

[51] Int. Cl.$^5$ .................. B01J 13/16; B41M 5/165
[52] U.S. Cl. .................. 428/402.21; 264/4.7; 503/213
[58] Field of Search .................. 264/4.7; 428/402.21

[56] References Cited

U.S. PATENT DOCUMENTS

| | | | |
|---|---|---|---|
| 3,900,669 | 8/1975 | Kiritani | 264/4.7 X |
| 4,021,595 | 5/1977 | Kiritani et al. | 503/213 |
| 4,193,889 | 3/1980 | Baatz et al. | 428/402.21 |
| 4,428,978 | 1/1984 | Jabs et al. | 264/4.7 X |
| 4,876,290 | 10/1989 | Vivant | 264/4.7 X |
| 4,889,877 | 12/1989 | Seitz | 264/4.7 X |
| 4,902,667 | 2/1990 | Whitcomb et al. | 503/217 X |
| 5,011,885 | 4/1991 | Chen et al. | 427/213.34 X |
| 5,037,716 | 8/1991 | Moffatt | 430/109 |

Primary Examiner—Richard D. Lovering
Assistant Examiner—John M. Covert
Attorney, Agent, or Firm—Killworth, Gottman, Hagan & Schaeff

[57] ABSTRACT

A process for the production of microcapsules containing a core material is provided and includes the steps of providing a polar solvent, and adding thereto a dispersion of a tertiary aliphatic isocyanate and a core material in an oleophilic liquid and an amine-containing composition having at least three primary amine groups to form a mixture. The mixture containing these components is reacted to form microcapsules containing the core material. The tertiary aliphatic isocyanate preferably comprises an adduct of m-tetramethylxylene diisocyanate and trimethylolpropane. The core material may contain a dyestuff precursor which is capable of reacting with a color developer to form a color. The microcapsules containing dyestuff precursor may be used to coat a support sheet to form carbonless copy paper.

12 Claims, No Drawings

MICROENCAPSULATION USING TERTIARY ALIPHATIC ISOCYANATE CAPSULE WALL MATERIAL

BACKGROUND OF THE INVENTION

The present invention generally relates to a process for the production of microcapsules which may be used to coat carbonless copy papers. More particularly, the present invention relates to a process for making microcapsules where the wall material is the reaction product of a tertiary aliphatic isocyanate and an amine-containing composition that is at least trifunctional in primary amine groups.

An the manufacture of pressure-sensitive recording papers, better known as carbonless copy papers, a layer of pressure-rupturable microcapsules containing a solution of colorless dyestuff precursor is normally coated on the back side of the front sheet of paper of a carbonless copy paper set. This coated back side is known as the CB coating. In order to develop an image or copy, the CB coating must be mated with a paper containing a coating of a suitable color developer, also known as dyestuff acceptor, on its front. This coated front color developer coating is called the CF coating. The color developer is a material, usually acidic, capable of forming the color of the dyestuff by reaction with the dyestuff precursor.

Marking of the pressure-sensitive recording papers is effected by rupturing the capsules in the CB coating by means of pressure to cause the dyestuff precursor solution to be exuded onto the front of the mated sheet below it. The colorless or slightly colored dyestuff precursor then reacts with the color developer in the areas at which pressure was applied, thereby effecting the colored marking. Such a mechanism for the technique of producing pressure-sensitive recording papers is well known.

Also well known are self-contained (SC) sheets which have the CB coating and the CF coating layered or admixed on a support sheet. Such sheets are also considered to be carbonless copy papers.

The microcapsules used in carbonless copy paper systems generally contain an oleophilic core material containing a dyestuff precursor encapsulated within strong protective outer walls or shells. The wall or shell acts to retain the core material until the wall is ruptured by mechanical pressure. Typically, microcapsule slurries used to coat the copy papers are comprised of individual capsules which may range in size from 0.1 to 50 microns in size.

The encapsulation of an oily solution by dispersing or emulsifying a wall-forming material and a polyamine or polyamine adduct in an aqueous solution is known in the art. For example, U.S. Pat. No. 4,021,595 teaches the use of a polyisocyanate adduct having a free isocyanate group and a polyamine or polyamine adduct having a free amine group as a polymerization promoter, where the polyisocyanate is dissolved in an oily liquid, wherein the oily liquid is dispersed or emulsified in a polar solvent. The addition of the polyamine having a free amine group to the emulsion or dispersion insolubilizes the polyisocyanate at the interface. This produces microcapsules for use on pressure-sensitive recording papers.

In U.S. Pat. 4,193,889, a film-forming aliphatic polyisocyanate containing at least one biuret group with a chain-extending agent is dissolved in an oily liquid and the encapsulation is carried out by reaction at the organic interface. The oily solution is dispersed under high shear in an aqueous phase containing a polyamine which is capable of reacting with isocyanates. The preferred polyisocyanate used in the process is based on hexamethylene 1,6-diisocyanate that forms a microcapsule wall when reacted in the aforementioned manner.

Similarly, in U.S. Pat. No. 4,428,978, microcapsules are produced by interfacial polyaddition from polyisocyanate and components containing active hydrogen. The isocyanurate-modified aliphatic polyisocyanate is reacted with a primary or secondary polyamine and the resulting suspension is reduced to a pH of 7 or below immediately after the polyaddition reaction. The slightly acidic pH of the resulting suspension slows the rate of reaction between the isocyanate and amine to produce a fully crosslinked capsule wall. Examples of primary and secondary amines used include diethylenetriamine and (bis(3-aminopropyl) amine.

The prior art references use diisocyanates coupled with either primary or secondary amines. However, it would be desirable to be able to use alternative materials to form capsule walls which are strong and retain the core material until ruptured. Accordingly, there is a need for a process for producing pressure-rupturable microcapsules by reacting alternative capsule wall materials to produce microcapsule walls which are strong enough to hold the microcapsule contents over an extended period of time and are rupturable only upon application of mechanical pressure.

SUMMARY OF THE INVENTION

That need is met by the present invention which provides a process for making microcapsules containing a core material and having the capsule wall material made by the ineerfacial polymerization of an amine-containing composition and a tertiary aliphatic isocyanate.

In accordance with one aspect of the present invention, a process for the production of microcapsules containing a core material is provided and includes the steps of providing a polar solvent, and adding thereto a dispersion of a tertiary aliphatic isocyanate and a core material in a hydrophobic liquid and an amine-containing composition having at least three primary amine groups to form a mixture. The mixture containing these components is reacted to form microcapsules containing the core material. The tertiary aliphatic isocyanate preferably comprises an adduct of m-tetramethylxylene diisocyanate and trimethylolpropane.

In a preferred embodiment of the invention, the core material contains a dyestuff precursor which is capable of reacting with a color developer to form a color. The microcapsules containing dyestuff precursor may be used to coat a support sheet such as paper stock to form carbonless copy paper. Alternatively, the core material may comprise perfume oils, flavorings, herbicides, or any of the many other materials which have heretofore been microencapsulated.

The polar solvent, which preferably is water, may also contain a protective colloid or emulsifying aid. The protective colloid may be any of those commonly used in the art, and is preferably selected from the group consisting of gelatin, gum arabic, casein, polyvinyl alcohol, and methyl vinyl ether/maleic anhydride copolymer. The polar solvent is preferably maintained at an elevated temperature of from about 50° C. to about 70°

C. so that the polymerization of the capsule walls proceeds rapidly. The pH of the mixture is preferably maintained at a neutral to slightly basic pH of approximately 7.5.

The amine-containing composition preferably has a molecular weight of at least 400 and comprises a straight oleophilic chain of from 4 to 12 carbon atoms, most preferably having a chain length of 6 carbon atoms. The term amine-containing composition as used herein includes not only amine compounds, but also compositions which contain the requisite amine-functional groups. Suitable amine-containing compositions may be selected from the group consisting of (tris)amino-1,6 hexamethylene biuret adduct, polyoxypropyleneamine, and N,N'-di(6-aminohexyl)-(6-aminohexylamino) succinamide. Other known amine-containing compositions having the requisite number of primary amine functional groups may also be used.

In carrying out the process of the present invention, the amine-containing composition may be added to the polar solvent either prior to the addition of the dispersion of tertiary aliphatic isocyanate and core material or after that addition. The microcapsules which are formed as a result of the interfacial polymerization reaction range in size from about 0.5 to about 100 microns, and preferably from about 2 to about 10 microns.

The process of the present invention may be used to produce a carbonless copy paper sheet by coating the microcapsule slurry formed by the interfacial polymerization reaction onto a substrate such as paper. The copy sheet thus comprises a paper sheet having a coating of microcapsules containing a core material comprising a dyestuff precursor, the walls of the microcapsules comprising the reaction product of a tertiary aliphatic isocyanate and an amine-containing composition having at least three primary amine groups. The microcapsules which are produced from the present invention can also be successfully used in making other products requiring encapsulation of an oleophilic solution.

Accordingly, it is an object of the present invention to provide a process for producing microcapsules containing a core material and a strong capsule wall material that is capable of holding the core contents for an extended period of time. It is also an object of the present invention to produce the microcapsule wall material from the reaction of an amine-containing composition having at least three primary amine groups and a tertiary aliphatic isocyanate. These and other objects, features and attendant advantages of the present invention will become apparent to those skilled in the art from a reading of the following detailed description and the appended claims.

DETAILED DESCRIPTION OF THE PREFERRED EMBODIMENT

In the production of microcapsules in accordance with the present invention, the capsule wall material is formed by a reaction between an amine-containing composition having at least three primary amine functional groups and a tertiary aliphatic isocyanate. In particular, the microcapsules are produced by dissolving the tertiary aliphatic isocyanate in an oleophilic solution along with a core material to be encapsulated. The isocyanate-containing oleophilic solution is then dispersed in a polar solvent which preferably contains an emulsifying aid or protective colloid to stabilize the emulsion which is formed.

The preferred tertiary isocyanate is an adduct based on m-tetramethylxylene diisocyanate (hereinafter m-TMXDI). This isocyanate has characteristics typical of aliphatic diisocyanates, but additionally has an aromatic ring. Because the isocyanate groups of m-TMXDI are separated from the ring by methyl groups, unlike aromatic isocyanates, this isocyanate will not prematurely react with color former dyes when used to make carbonless copy paper. The preferred tertiary aliphatic isocyanate is synthesized from m-TMXDI and trimethylolpropane (hereinafter TMP) to produce an m-TMXDI/TMP adduct which is commercially available under the trademark Cythane Polyisocyanate from American Cyanamid Co.

However, since m-TMXDI/TMP is a tertiary aliphatic isocyanate, it has reduced reactivity and tends to react more slowly or not react at all with many hydroxyl and amino compounds including those amine compositions used in the prior art to react with diisocyanates. When the primary and secondary amines of the prior art, having fewer than three primary amine functional groups, are reacted with tertiary isocyanates, a reduction in crosslink density is experienced, thus reducing the amine-isocyanate reaction rate. While a polyamine with two primary amine groups and one secondary amine group is trifunctional with a primary isocyanate, it becomes effectively only difunctional with a tertiary isocyanate due to the poor reactivity of secondary amines with tertiary isocyanates. In addition, steric factors further hinder the rate of amine-isocyanate reaction because of branched alkyl groups adjacent to both the secondary amine and the tertiary isocyanate.

Together, these obstacles to capsule wall formation prevent the amine-isocyanate reaction from progressing to completion. The result is core material contained in capsules that are not completely crosslinked and which are easily rupturable. The core contents are capable of readily escaping through the weak capsule walls within a short period of time. Consequently, when such microcapsules are used to make carbonless copy paper, the imaging ability of the microcapsule coated sheet is reduced and further, shading or discoloration of the underlying color former sheet occurs.

Accordingly, to produce a microcapsule wall material that is strong and has the ability to retain the core contents, the preferred amine-containing reactant must contain at least three primary amine functional groups and preferably also have a molecular weight of 400 or greater so as to allow free movement of the pendent amine groups and thus, result in a more rapid and complete reaction of the tertiary aliphatic isocyanate. Furthermore, the preferred amine will have the primary amine groups attached to a straight (i.e., not branched) oleophilic chain of from 4 to 12 carbon atoms. Most preferably, the straight oleophilic chain will have 6 carbon atoms. The chain length insures sufficient degrees of freedom to avoid steric hindrance and allows the pendent primary amine groups to crosslink effectively with the tertiary aliphatic isocyanate.

Examples of the preferred amine-containing composition having the aforementioned characteristics include (tris)amino-1,6 hexamethylene biuret adduct, polyoxypropyleneamine (commercially available under the designation Jeffamine T-403 from Texaco Chemical Co.), N,N'-di(6-aminohexyl)-(6-aminohexylamino) succinamide (experimentally available from American Cyanamid Co.), and other similar amines that have the aforementioned functionality. These preferred amines have the capability of being dispersed in the polar solvent either before the addition of the isocyanate-containing oleophilic solution or after the resulting emulsion is formed.

The preferred oleophilic solution for use in the microencapsulation process is an organic solvent which is not miscible with water. Examples of preferred oleophilic solutions include diisopropylnapthalene, secondary butyl biphenyl, and chlorinated paraffins. Typically, in the manufacture of microcapsules for coated carbonless paper, dyestuff precursors or color former dyes will be dissolved in these solvents such that when the microcapsules are mechanically ruptured and they contact a color developer, a variety of colors can be produced.

The preferred polar solvent used in the production of the microcapsules of the present invention is a water solution, preferably containing at least one protective colloid or emulsifier. The preferred protective colloid should serve as a surface active agent to help control the emulsion droplet sizes as well as to stabilize the emulsion throughout the reaction. Examples of preferred protective colloids include gelatin, gum arabic, casein, polyvinyl alcohol, and methyl vinyl ether/maleic anhydride copolymer.

Microcapsules produced using the amine-tertiary isocyanate reaction to form the microcapsule wall material may be produced either continuously or in individual batches. Further, the resulting microcapsule particle size may be in the range of from 0.5 to 100 microns, and most preferably from 2 to 10 microns The aforementioned protective colloid may be used to control or direct the particle size to the preferable range. Preferably, the reaction temperature should be elevated to a range from 50° C. to about 70° C.

The present encapsulation process allows for a complete reaction between the primary amine functional groups and the tertiary aliphatic isocyanate and therefore, results in stronger capsule walls capable of holding the core contents for an extended period of time. The complete amine-tertiary isocyanate reaction occurs because the present invention uses an amine-containing composition that has at least three primary amine functional groups, as well as a molecular weight greater than 400, with a straight chain length of 4 to 12 carbon atoms. An amine-containing composition having these characteristics does not have steric hindrance which could prevent completion of the reaction.

The completed capsules are non-aggregated single capsules that have strong capsule walls which are stable under low pressure and friction. The key to achieving this result is the completion of the amine-tertiary isocyanate interfacial polymerization reaction. Infrared (IR) scans of the reacted microcapsule slurry show that no tertiary aliphatic isocyanate remains after the emulsion was reacted at 60° C. for two hours.

In order that the invention may be more readily understood, reference is made to the following examples, which are intended to be illustrative of the invention, but are not intended to be limiting in scope.

Example I 61.25 gm of N-102 (Black Leuco Dye) and 5.10 gm Crystal Violet Lactone (BlueLeuco Dye) together as dyestuff precursors were added to 954.41 gm of diisopropylnapthalene to form an oleophilic solution. 268.6 gm of m-TMXDI/TMP adduct (trademark Cythane Polyisocyanate from American Cyanamid Co.) was added to the oleophilic solution which was thereafter heated to 55° C.

The oleophilic solution was then dispersed in 1927.55 gm of water containing 66.56 gm of 35% Gantrez AN-119 Solution (trademark for methyl vinyl ether/maleic anhydride copolymer), 18.22 gm of casein, and 18.22 gm of polyvinylpyrrolidone to form a mixture. The pH of the mixture was adjusted to 7.5 by the addition of 6.18 gm borax and subsequently heated to 55° C.

The mixture was emulsified using a Waring blender to produce a microemulsion with a particle size range of from 2 to 10μ and an average size of 5.6μ. To the resulting emulsion was added a solution of 100 gm of water blended with 78.43 gm of (tris)amino-1,6 hexamethylene biuret adduct. The temperature of the emulsion was raised to 60° C. and exposed to low shear stirring for an additional two hours so as to complete the capsule wall formation. The microcapsules produced had a capsule solids content of 43.2% by weight and a Brookfield viscosity of 205 cps.

The resulting microcapsules were coated on paper substrates and placed in a 60° C. oven under pressure against a color former (CF) sheet for two weeks. There was no reduction in the imaging ability of the capsule sheet, nor was there any shading or discoloration of the underlying color former sheet.

Example II 61.25 gm of N-102 (Black Leuco Dye) and 5.10 gm Crystal Violet Lactone (Blue Leuco Dye) together as dyestuff precursors were added to 954.41 gm of diisopropylnapthalene to form an oleophilic solution. 268.6 gm of m-TMXDI/TMP adduct (trademark Cythane Polyisocyanate from American Cyanamid Co.) was added to the oleophilic solution which was thereafter heated to 55° C.

The oleophilic solution was then dispersed in 1927.55 gm of water containing 66.56 gm of 35% Gantrez AN-119 Solution (trademark for methyl vinyl ether/maleic anhydride copolymer), 18.22 gm of casein, and 18.22 gm of polyvinylpyrrolidone to form a mixture. The pH of the mixture was adjusted to 7.5 by the addition of 6.18 gm borax and subsequently heated to 55° C.

The mixture was emulsified using a Waring blender to produce a microemulsion with an average droplet diameter of 4.5μ. To the resulting emulsion, a solution of 100 gm of water blended with 82.39 gm of N,N'-di(6-aminohexyl)-(6-aminohexylamino) succinamide was added. The temperature of the emulsion was raised to 60° C. and exposed to low shear stirring for an additional two hours so as to complete the capsule wall formation. The microcapsules produced had a capsule solids content of 42% by weight and a Brookfield viscosity of 180 cps.

The resulting microcapsules were coated on paper substrates and placed in a 60° C. oven under pressure against a color former (CF) sheet for two weeks. There was no reduction in the imaging ability of the capsule sheet, nor was there any shading or discoloration of the underlying color former sheet.

Example III 61.25 gm of N-102 (Black Leuco Dye) and 5.10 gm Crystal Violet Lactone (Blue Leuco Dye) together as dyestuff precursors were added to 954.41 gm of diisopropylnapthalene to form an oleophilic solution. 268.6 gm of m-TMXDI/TMP adduct (trademark Cythane Polyisocyanate from American Cyanamid Co.) was added to the oleophilic solution which was thereafter heated to 55° C.

The oleophilic solution was then dispersed in 1927.55 gm of water containing 66.56 gm of 35% Gantrez AN-119 Solution (trademark for the methyl vinyl ether/maleic anhydride copolymer), 18.22 gm of casein, and 18.22 gm of polyvinylpyrrolidone to form a mixture. The pH of the mixture was adjusted to 7.5 by the addition of 6.18 gm borax and subsequently heated to 55° C.

The mixture was emulsified using a Waring blender to produce a microemulsion with a droplet size range from 2 to 10μ with an average size of 5.0μ. To the resulting emulsion, a solution of 100 gm of water blended with 81.80 gm of polyoxypropyleneamine was added. The temperature of the emulsion was raised to 65° C. and exposed to low shear stirring for an additional two hours so as to complete the capsule wall formation. The microcapsules produced had a capsule solid content of 42% by weight and a Brookfield viscosity of 195 cps.

The resulting microcapsules were coated on paper substrates and placed in a 60° C. oven under pressure against a color former (CF) sheet for two weeks. There was no reduction in the imaging ability of the capsule sheet, nor was there any shading or discoloration of the underlying color former sheet.

Having thus described the present invention in detail, it will be obvious to those skilled in the art that various changes or modifications may be made without departing from the scope of the invention defined in the appended claims and described in the specification.

What is claimed is:

1. A process for the production of microcapsules containing a core material comprising the steps of:
   providing a polar solvent, adding thereto a) a dispersion of a tertiary aliphatic isocyanate and a core material in an oleophilic liquid, said tertiary aliphatic isocyanate comprising an adduct of m-tetramethylxylene diisocyanate and trimethylolpropane, and b) an amine-containing composition having at least three primary amine groups to form a mixture, said amine-containing composition being selected from the group consisting of (tris)amino-1,6 hexamethylene biuret adduct, polyoxypropyleneamine, and N,N'-di(6-aminohexyl)-(6-aminohexylamino) succinamide; and
   reacting said tertiary aliphatic isocyanate with said amine-containing composition to form microcapsules containing said core material.

2. The process of claim 1 wherein said core material contains a dyestuff precursor.

3. The process of claim 1 wherein said polar solvent contains a protective colloid.

4. The process of claim 3 wherein said protective colloid is selected form the group consisting of gelatin, gum arabic, casein, polyvinyl alcohol, and methyl vinyl ether/maleic anhydride copolymer.

5. The process of claim 1 wherein said polar solvent is water.

6. The process of claim 1 wherein said amine-containing composition is polyoxypropyleneamine.

7. The process of claim 1 wherein said polar solvent is at a temperature of from about 50° C. to about 70° C.

8. The process of claim 1 wherein said amine-containing composition is added to said polar solvent prior to the addition of said dispersion of tertiary aliphatic isocyanate and core material.

9. The process of claim 1 wherein said amine-containing composition is added to said polar solvent after the addition of said dispersion of tertiary aliphatic isocyanate and core material.

10. The process of claim 1 wherein said microcapsules range in size from about 2 to about 10 microns.

11. The process of claim 1 wherein the pH of said mixture is adjusted to about 7.5.

12. The product produced by the process of claim 1.

* * * * *